June 5, 1928. 1,672,427
J. M. RUSSELL
PARACHUTE
Filed Jan. 10, 1927 2 Sheets-Sheet 2
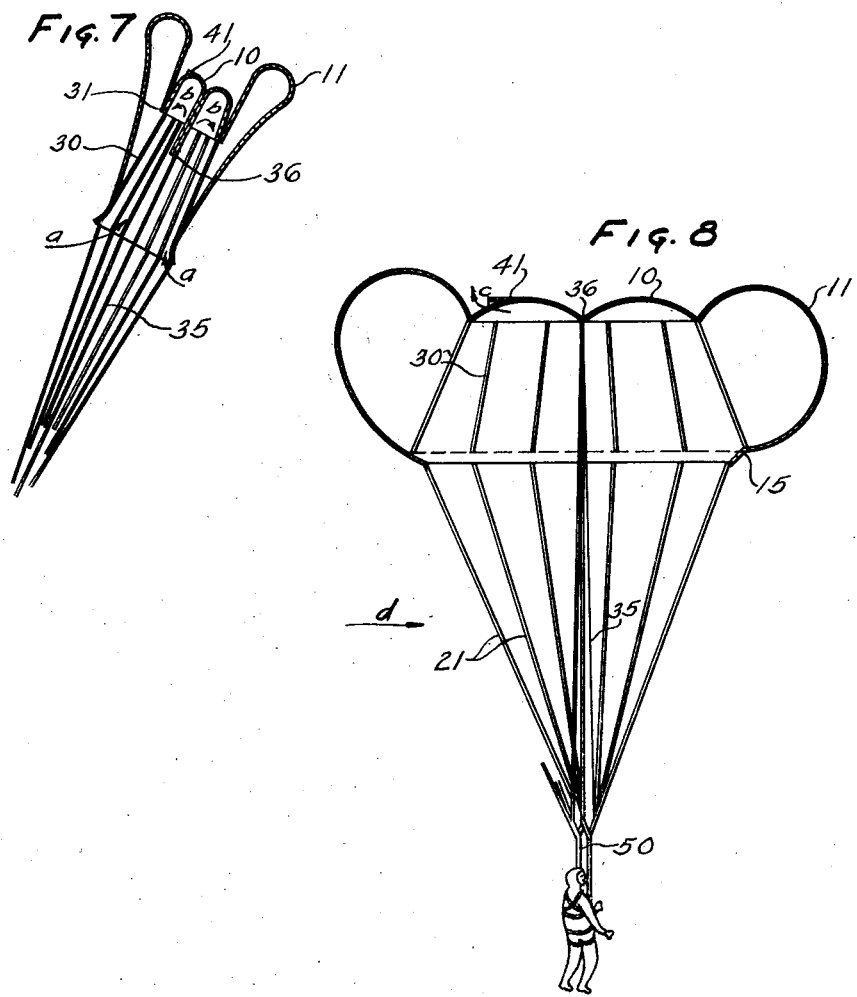
INVENTOR.
James M Russell
BY Maréchal and Noe
ATTORNEYS.

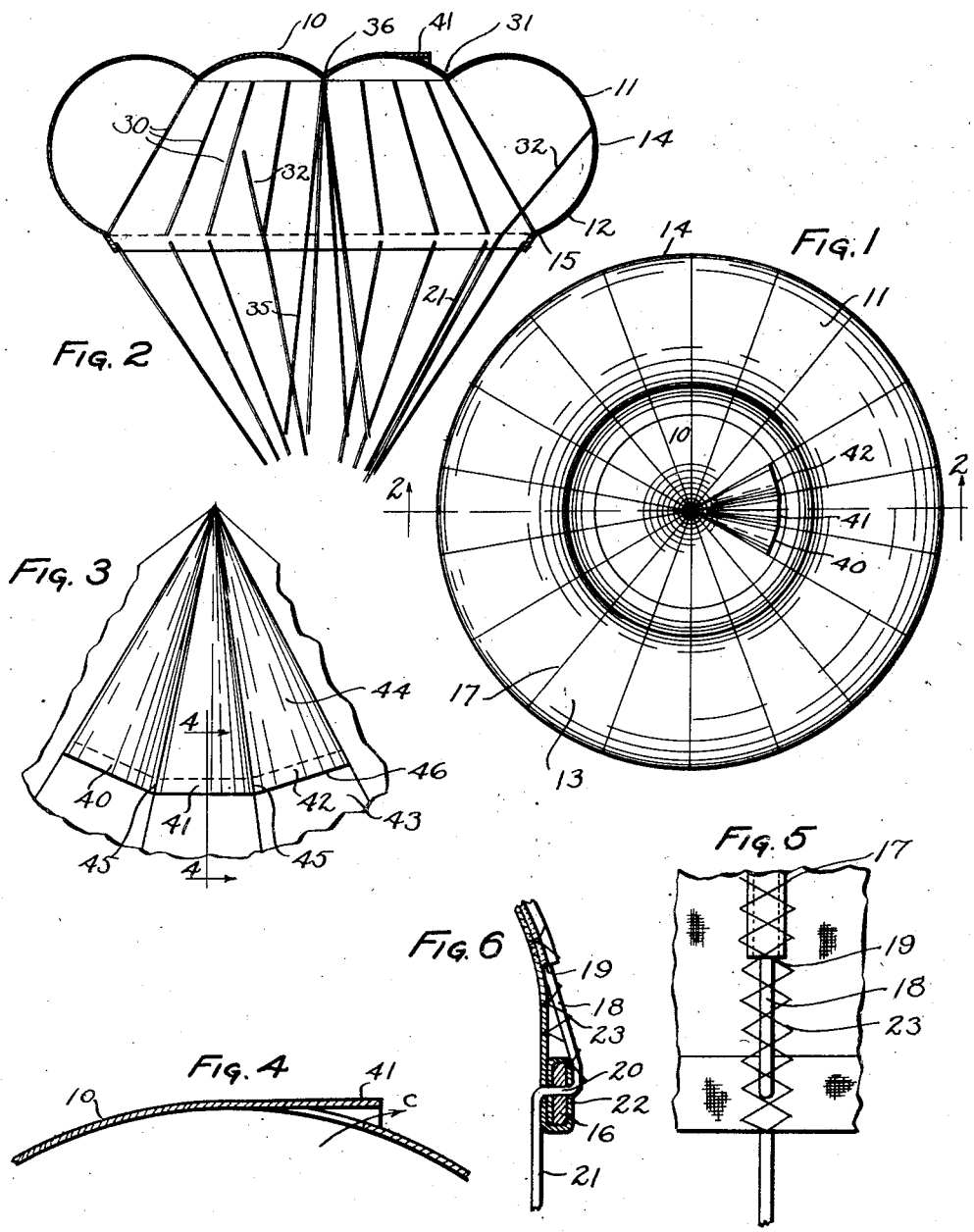

Patented June 5, 1928.

1,672,427

UNITED STATES PATENT OFFICE.

JAMES M. RUSSELL, OF SAN DIEGO, CALIFORNIA, ASSIGNOR, BY MESNE ASSIGNMENTS, TO RUSSELL PARACHUTE COMPANY, OF WILMINGTON, DELAWARE, A CORPORATION OF DELAWARE.

PARACHUTE.

Application filed January 10, 1927. Serial No. 160,098.

This invention relates to supporting parachutes for aeronautical use and more particularly to parachutes which are adapted to sustain an aviator while descending through the air.

One object of the invention is to provide a parachute having means inherent in its construction for turning the parachute so that the aviator may face in the same direction as a wind, and thus alight on the ground facing in the direction of his forward motion along the ground.

A further object of the invention is to provide a parachute which embodies a peripheral band of material extending around the edge of the parachute through the body of which the shroud lines or suspension cords of the parachute extend, so that a strong attachment may be produced at the joint between the peripheral band and the shroud lines.

A further object of the invention is to provide a parachute having a depressed central sustaining portion which is pulled down a predetermined amount so that air is deflected outwardly from the central sustaining portion of the parachute, especially during its opening stages, into an outer peripheral lobed portion with which the parachute is provided.

Further objects and advantages of the invention will be more fully set forth and explained in detail in the accompanying description and drawings in which one embodiment of my invention is set forth.

In the drawings,

Fig. 1 is a plan view of the parachute;

Fig. 2 is a central vertical section through the parachute in its fully opened position;

Fig. 3 is a plan view showing the vents which are provided on one side of the parachute;

Fig. 4 is a section through one of the vents on the line 4—4 of Fig. 3;

Fig. 5 is a detail view showing the method of attaching the shroud lines to the folded outer edge of the canopy;

Fig. 6 is a section taken radially through the outer edge of the parachute;

Fig. 7 is a central section through the parachute during its initial opening stage; and Fig. 8 is a section of a parachute descending in a wind showing the manner of attaching the suspension lines to an aviator's harness.

Referring more particularly to the drawings in which corresponding numerals designate like parts in the various figures the parachute canopy in the embodiment of the invention herein illustrated consists of a central sustaining portion 10 and an outer peripheral lobed portion 11 which extends downwardly and inwardly at its lower edge as shown at 12. The parachute canopy is constructed of a number of radially attached segments 13 which have a maximum width at the point of maximum diameter of the parachute as indicated at 14, the width of the segments decreasing from that point on to the lower edge portion 15 where they are attached to an outer peripheral circular band 16 of flexible material such as fabric. The various seams 17 by which the adjacent segments are attached together enclose radially extending cords 18 which may extend only along the central sustaining portions of the parachute seams, or if desired may extend the full length of the seams up to the peripheral band 16. In the latter case the cords 18 extend out through the seams at points adjacent the outer edge of the canopy as indicated at 19 and they then pass downwardly and extend through holes in the adjacent parts of the peripheral band 16 as shown at 20 in Fig. 6. After passing through the band 16 they extend downwardly as indicated at 21 and at their lower ends are attached to suspension straps of the aviator's harness.

The peripheral band 16 is enclosed by the outer edge of the canopy which is folded over and around the band 16 as shown in Fig. 6. The cords 18 extend directly through the folded peripheral portion 22 of the parachute and through the band 16 and they are all held flat together by means of cross stitching 23 which zigzags along the connection and over the folded periphery of the parachute. A snubbing action will therefore obtain between the laterally extending strengthening cords 18 and the peripheral band 16 so that the points of attachment of the suspension cords 21 will not tear loose. A pull upon the suspension cords 21 will have the effect of tightening the upper ends of these cords against the peripheral band which is held expanded in a taut condition by the air pressure within the parachute. The diameter of the band 16 is substantially less than the maximum diameter of the parachute.

The shape of the outer peripheral lobe 11 is maintained by means of the downwardly extending cords 30 which are attached along the outer circular edge 31 of the central sustaining portion 10 of the parachute. The length of the cords 30 is considerably less than the radial distance along the parachute surface between the points of attachment of the opposite ends of the cords. These cords extend almost vertically downwards and at their lower ends pass through the peripheral fold and the flexible band 16 at the outer edge of the parachute in the same manner as the laterally extending cords 18 and are attached in a similar way by means of cross stitching at the points of attachment at their lower ends. The interconnection thus provided at the outer circular edge 31 of the central sustaining portion of the parachute and the lower edge of the peripheral lobed portion thus maintains the shape of the parachute in its opened sustaining condition as shown in Fig. 2 so that the outer peripheral lobe may act as a stabilizing means and prevent the oscillation and rapid descent of the parachute as more fully set forth in my prior application entitled Parachute, Serial No. 88,851, filed February 17, 1926.

The center of the central sustaining portion 10 of the parachute is connected to a series of load sustaining cords 35 which are connected at their upper ends at the point 36 at the center of the parachute and at their lower ends are connected as shown in Fig. 8 to the suspension straps of the aviator's harness. These cords 35 are of fixed length and the relation of the length of the cords 35 to the length of the sustaining cords 21 is such that the center of the parachute will be pulled down a predetermined amount so as to be substantially even at its depressed center with the outer part 31 of the central sustaining portion as shown in Fig. 2 when the parachute is fully opened.

When the parachute is first released its position is shown in Fig. 7 and in this stage the outer circular part 31 of the circular sustaining portion is pulled down by means of the cords 30 so that the lobe portion 11 extends upwardly substantially as shown in this figure. The central point 36 of the parachute being attached to the load by the cords 35 of fixed length causes the central part of the parachute to be pulled down considerably below the part 31 in the opening stages of the parachute so that air entering the bottom of the parachute as shown by the arrows $a$ in Fig. 7 will be deflected from the central sustaining portion 10 into the peripheral lobe 11 as shown by the arrows $b$ thus preventing an excessive air pressure from being applied initially to the central portion of the parachute and causing the instantaneous expansion of the peripheral lobe so as to cause a rapid opening of the parachute. The rapidity with which the parachute opens may be controlled by making the central load sustaining lines 35 of the proper length to pull down the center of the parachute the desired amount, the length of these lines 35 controlling the amount of deflection of the air into the peripheral lobe during the opening stages of the parachute and controlling the rapidity of its lateral expansion.

On one side of the sustaining portion of the parachute there are provided one or more vents to permit the release of air from one side only of the body of the parachute. Referring particularly to Figs 1 and 3 the three vents 40, 41 and 42 are provided by constructing each of the corresponding panels of two pieces 43 and 44 which are overlapped slightly so that the innermost piece 44 extends over and outside of the inner end of piece 43. The two pieces are attached together along radial seam lines at 45 between which the pieces are devoid of connection, and the width of the upper piece 44 along the line 46 is slightly larger than the width of the corresponding portion 43 below it so that a slight fullness exists in the upper piece of the segment at the vent. This permits the release of air from the center of the parachute as shown by arrow $c$ in Fig. 4 which relieves the air pressure slightly on one side of the parachute for a purpose which will be presently described. These vents are provided preferably in the central sustaining portion 10 at points near its outer edge as shown so that when the parachute is fully opened the air will be directed outwardly through the vents in a substantially horizontal direction. The various shroud lines or suspension cords of the parachute are attached to the aviator's suspension harness 50 so that the vents face rearwardly and towards the back of the aviator. The effect of these vents is to slightly decrease the inflation of the canopy on the side on which the vents are provided. This causes the front or unvented portion to present a slightly greater bulk to be affected by the wind, than the slightly deflated rear or vented portion. This is true since the lobe portion at the rear or vented side is forced inwardly laterally as shown in Fig. 8 by the decreased or relieved internal pressure and the consequent reduction in its horizontal effective area. In the descent of the parachute, which takes place with the aviator suspended vertically, the front portion of the canopy, presenting the greatest area or bulk to the wind, is turned from the wind, and the aviator will thus face in the same direction as the prevailing wind and he may land so as to be facing in the direction of his forward movement in relation to the earth. One explanation for the turning effect to face the aviator in the same direction as the wind is blowing is as follows:

There is a slight relative motion between the wind and the parachute even though the parachute is descending in the wind and substantially with the wind due to the fact that the entire mass is rapidly descending, and the effect of the wind as indicated by the arrow *d* in Fig. 8 against the parachute is to cause the parachute to be turned with its smaller bulk facing into the wind in the same manner as the small arrow end of a weathercock faces into the wind. The result is that the parachute turns in case the aviator is not facing in the same direction as the wind until it obtains its proper position in the air with its more inflated and bulky forward side facing in the same direction as the wind is blowing thus presenting the front of the aviator in the proper position so that he may land without being thrown upon his back.

While the construction herein described constitutes a preferred embodiment of the invention, it is to be understood that the invention is not limited to this precise construction, and that changes may be made therein without departing from the scope of the invention which is defined in the appended claims.

What is claimed is:

1. In a parachute, a canopy having a centrally depressed sustaining portion and an outer peripheral portion, and suspension lines attached to the center and the periphery of the parachute and connected to a supporting harness at their lower ends, and vent means unsymmetrically arranged on said canopy for normally unsymmetrically relieving the pressure on the canopy for the purpose described.

2. In a parachute, a canopy having a central sustaining portion having an outer lobed peripheral portion extending downwardly and inwardly at its outer edge, suspension lines extending downwardly from said canopy and including lines attached to the center of the canopy for normally depressing the same, and a vent on one side of said depressed center for laterally venting the air upon said one side for the purpose described.

3. In a parachute, a canopy having a central sustaining portion and an outer peripheral lobed portion, and suspension lines extending from the parachute periphery and from the center of the canopy, said lines having relative lengths to depress the center of the central portion a predetermined amount in normal descent.

4. In a parachute, a canopy having a central sustaining portion and an outer peripheral lobed portion extending downwardly and inwardly at its outer edge, suspension lines attached to the outer edge of said lobed portion, auxiliary lines joining the said outer edge and the outer edge of the central portion, and auxiliary load carrying lines for normally depressing the center of said central sustaining portion.

5. In a parachute, a canopy, means associated with said parachute for causing one side of the parachute to have greater sustaining effect than the other at all times and suspension cords connecting said parachute to a harness so that an aviator in said harness faces in the same direction as the portion of the canopy having a greater sustaining effect so that the parachute and aviator are automatically positioned in relation to the wind to effect a landing with the aviator facing forwardly in the direction of his motion relative to the earth.

6. In a parachute, a canopy having a central sustaining portion and an outer peripheral lobed portion extending downwardly and inwardly at its outer edge, and an annular vent in one side only of said canopy for turning the same into a predetermined relation to a wind, said vent being formed of overlapping panel pieces attached together on radial lines to provide a vent opening which relieves the air laterally.

7. In a parachute, a canopy consisting of sections attached together along a seam, an annular peripheral band of fabric wrapped in and attached to the peripheral portions of said sections, shroud lines extending along said seam and passing directly through said band and the peripheral portions of said sections and continuing on to support a load.

8. In a parachute, a canopy consisting of sections attached together along a seam, an annular peripheral band of fabric attached to the peripheral portions of said section, shroud lines extending along said seam and passing through said band and continuing on to support a load, and stitching attaching said band and shroud lines together so that said lines lie flat against both sides of said band.

9. In a parachute, a supporting canopy comprising a central portion, and a peripheral outer lobed portion, an outer flat peripheral flexible band of material at the lower part of the lobed portion, shroud lines extending from the canopy, passing centrally through said band so as to lie flat against both sides of said band, and means for attaching said band and said shroud lines together.

10. In a parachute, a supporting canopy comprising a central portion, and a peripheral outer lobe portion extending downwardly and inwardly at its lower edge, a circular flat peripheral band of flexible material at the edge of said lobed portion, and shroud lines extending radially along said lobed portion passing directly through said band so as to lie flat against both sides of said band, and stitching attaching said band and said shroud lines together so that said lines lie flat against said band.

11. In a parachute, a canopy consisting of sections attached together along radial seams and having its peripheral edge folded back along itself, a fabric band extending around the peripheral edge and enclosed by said fold, shroud lines extending within said seams to points adjacent said peripheral edge, then extending out of said seams to pass directly through said band and said fold, and continuing on for attachment to a supported load.

12. In a parachute, a canopy consisting of sections attached together along radial seams and having its peripheral edge folded back along itself, a flat fabric band extending around the peripheral edge and enclosed by said fold, shroud lines extending within said seams to points adjacent said peripheral edge, then extending out of said seams to pass directly through the center of the flat band and said fold, and continuing on for attachment to a supported load, and cross-stitching attaching said band, shroud lines and the said folded peripheral edge all together.

13. In a parachute, a canopy, having a rearwardly facing vent in the body of the canopy between the center and the periphery, and in the rear side only of the canopy to direct the air rearwardly in a substantially horizontal direction, and suspension cords connecting said parachute to an aviator's harness so that the aviator faces forwardly and is automatically positioned so that he lands facing forwardly in the direction of his motion relative to the earth.

14. In a parachute, a canopy having a central sustaining portion and an outer peripheral lobe portion curving downwardly and inwardly therefrom, a vent in the rear side only of said canopy, and suspension cords connecting said parachute to an aviator's harness so that the aviator is automatically faced forwardly to land facing in the direction of his motion relative to the earth.

15. In a parachute, a canopy, said canopy having an opening in one portion thereof for causing that portion to have less sustaining effect at all times, suspension cords connected to said canopy, and a harness connected to said suspension cords so that an aviator faces in the same direction as the portion of the canopy having the greater sustaining effect so that the parachute and aviator are automatically positioned in relation to the wind to effect landing with the aviator facing forwardly in the direction of his motion relatively to the earth.

In testimony whereof I hereto affix my signature.

JAMES M. RUSSELL.